(12) United States Patent
Resurreccion et al.

(10) Patent No.: US 9,551,988 B2
(45) Date of Patent: Jan. 24, 2017

(54) METHODS AND APPARATUS TO MANAGE PROCESS CONTROL RESOURCES

(75) Inventors: Enrico J. Resurreccion, Taytay (PH); Michael C. Lucero, III, Meycauayan (PH)

(73) Assignee: FISHER-ROSEMOUNT SYSTEMS, INC., Round Rock, TX (US)

(*) Notice: Subject to any disclaimer, the term of this patent is extended or adjusted under 35 U.S.C. 154(b) by 1316 days.

(21) Appl. No.: 13/080,186

(22) Filed: Apr. 5, 2011

(65) Prior Publication Data

US 2012/0259436 A1 Oct. 11, 2012

(51) Int. Cl.
*G06F 3/14* (2006.01)
*G05B 23/02* (2006.01)

(52) U.S. Cl.
CPC .................. *G05B 23/0216* (2013.01)

(58) Field of Classification Search
CPC .................... G06F 3/14; G06F 3/17
USPC ....... 715/200–277, 700–867; 700/12, 18, 83, 700/701–866; 709/201–229; 705/14.58, 705/50–79; 345/30–111
See application file for complete search history.

(56) References Cited

U.S. PATENT DOCUMENTS

| | | | |
|---|---|---|---|
| 5,880,716 A | 3/1999 | Kunugi | |
| 5,936,624 A | 8/1999 | Lisle et al. | |
| 6,104,394 A | 8/2000 | Lisle et al. | |
| 6,219,679 B1 | 4/2001 | Brisebois et al. | |
| 6,557,028 B2 | 4/2003 | Cragun | |
| 6,847,886 B2 | 1/2005 | Demir et al. | |
| 7,689,621 B1 | 3/2010 | Huber et al. | |
| 7,746,376 B2 | 6/2010 | Mendoza et al. | |
| 7,827,201 B1 | 11/2010 | Gordon et al. | |
| 2005/0010307 A1* | 1/2005 | Dove et al. ................ | 700/18 |
| 2007/0022385 A1 | 1/2007 | Denissov | |
| 2007/0179645 A1 | 8/2007 | Nixon et al. | |
| 2008/0040684 A1 | 2/2008 | Crump | |

(Continued)

FOREIGN PATENT DOCUMENTS

| | | |
|---|---|---|
| EP | 0 892 326 | 1/1999 |
| EP | 1 207 441 | 5/2002 |
| JP | 4 039691 | 2/1992 |

OTHER PUBLICATIONS

Patent Cooperation Treaty, "Invitation to Pay Additional Fees and, Where Applicable, Protest Fee", issued in connection with International application No. PCT/US2012/031946, mailed on Jul. 13, 2012, 6 pages.

(Continued)

*Primary Examiner* — Ruay Ho
(74) *Attorney, Agent, or Firm* — Hanley, Flight & Zimmerman, LLC

(57) ABSTRACT

Example methods and apparatus to manage process control resources are disclosed. A disclosed example method includes receiving a selection of a first process control resource within a process control system to be associated with a logical container, the logical container including other process control resources that have a same user defined characteristic in common with the first process control resource, creating an entry within the logical container for the first process control resource by storing an identifier of the first process control resource in the logical container, and assigning the first process control resource to the logical container so that the identifier of the first process control resource links to process control information associated with the first process control resource.

28 Claims, 10 Drawing Sheets

(56) References Cited

U.S. PATENT DOCUMENTS

2008/0074423 A1     3/2008  Gan et al.
2008/0312757 A9*   12/2008  Nixon et al. .................... 700/83
2011/0066256 A1*    3/2011  Sesay et al. .................... 700/12
2012/0323690 A1*   12/2012  Michael ..................... 705/14.58

OTHER PUBLICATIONS

Patent Cooperation Treaty, "International Preliminary Report on Patentability," issued in connection with International application No. PCT/US2012/031946, dated Oct. 17, 2013, 12 pages.

Federal Service for Intellectual Property Russia, "Office Action", issued in connection with Russian patent application No. 2013148916/08(076137), May 13, 2016, 4 pages.

The State Intellectual Property Office of the People's Republic of China, "The Second office action", issued in connection with Chinese patent application No. 201210101622.4, May 5, 2016, 2015, 5 pages.

European Patent Office, "Communication pursuant to Article 94(3) EPC," issued in connection with Eurpean patent application No. 12 712 525.0, Apr. 8, 2016, 7 pages.

International Searching Authority, "International Search Report," issued in connection with International Patent Application No. PCT/US2012/031946, mailed Nov. 13, 2012, 6 pages.

International Searching Authority, "Written Opinion," issued in connection with PCT Application No. PCT/US2012/031946, Nov. 13, 2012, 11 pages.

The State Intellectual Property Office of the People's Republic of China, "The First office action", issued in connection with Chinese patent application No. 201210101622.4, Sep. 1, 2015, 4 pages.

\* cited by examiner

US 9,551,988 B2

METHODS AND APPARATUS TO MANAGE PROCESS CONTROL RESOURCES

FIELD OF THE DISCLOSURE

The present disclosure relates generally to process control systems and, more particularly, to methods and apparatus to manage process control resources.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The controllers receive signals indicative of process measurements made by the field devices, process this information to implement a control routine, and generate control signals that are sent over the buses or other communication lines to the field devices to control the operation of the process. In this manner, the controllers may execute and coordinate control strategies or routines using the field devices via the buses and/or other communication links communicatively coupling the field devices.

Information from the field devices and the controllers may be made available to one or more applications (i.e., routines, programs, etc.) as runtime data executed by the operator workstation (e.g., a processor-based system) to enable an operator to perform desired functions with respect to the process. Some of these functions may include viewing the current state of the process (e.g., via a graphical user interface), evaluating the process, modifying the operation of the process (e.g., via a visual object diagram), etc. Many process control systems also include one or more application stations. Typically, these application stations are implemented using a personal computer, workstation, or the like that is communicatively coupled to the controllers, operator workstations, and other systems within the process control system via a local area network (LAN). Each application station may execute strategies, routines, or applications that perform campaign management functions, maintenance management functions, virtual control functions, diagnostic functions, real-time monitoring functions, safety-related functions, configuration functions, etc. within the process control system.

Application stations may include a plant asset manager to display information regarding field devices, controllers, and/or other process control components or resources. Frequently, plant asset managers organize information associated with field devices, controllers, and other process control components into a hierarchical structure that is based on the physical coupling of the field devices, controllers, and other process control components. Further, the hierarchical structure may be based on a physical location of the field devices, controllers, and other process control components. If process control personnel want to access a particular field device, the personnel have to navigate through the hierarchical structure. In some process control systems with many different areas or physical locations, tens of controllers, and thousands of field devices, navigating to a desired field device can be relatively difficult and time consuming.

SUMMARY

Example methods and apparatus to manage process control resources are described. In one example, a method includes receiving a selection of a first process control resource within a process control system to be associated with a logical container, the logical container including other process control resources that have a same user defined characteristic in common with the first process control resource. The example method also includes creating an entry within the logical container for the first process control resource by storing an identifier of the first process control resource in the logical container. The example method further includes assigning the first process control resource to the logical container so that the identifier of the first process control resource links to process control information associated with the first process control resource.

In another example, a method includes displaying a pictorial representation of a process control system and determining a location of a process control field device within the pictorial representation by matching location information associated with the process control field device to a corresponding location within the pictorial representation. The example method also includes displaying an icon in proximity to the location within the pictorial representation, the icon being a graphical representation of the process control field device and linking to information associated with the process control field device.

An example apparatus includes a container manager to select an icon representative of a process control resource within a process control system requested to be associated with a logical container, the icon including a link to information associated with the process control resource. The example container manager also is to assign the process control resource to the logical container so that the icon of the process control resource is displayed within the logical container via a user interface, the logical container including other process control resources that have a same user defined characteristic in common with the process control resource.

DETAILED DESCRIPTION

Figure 1:
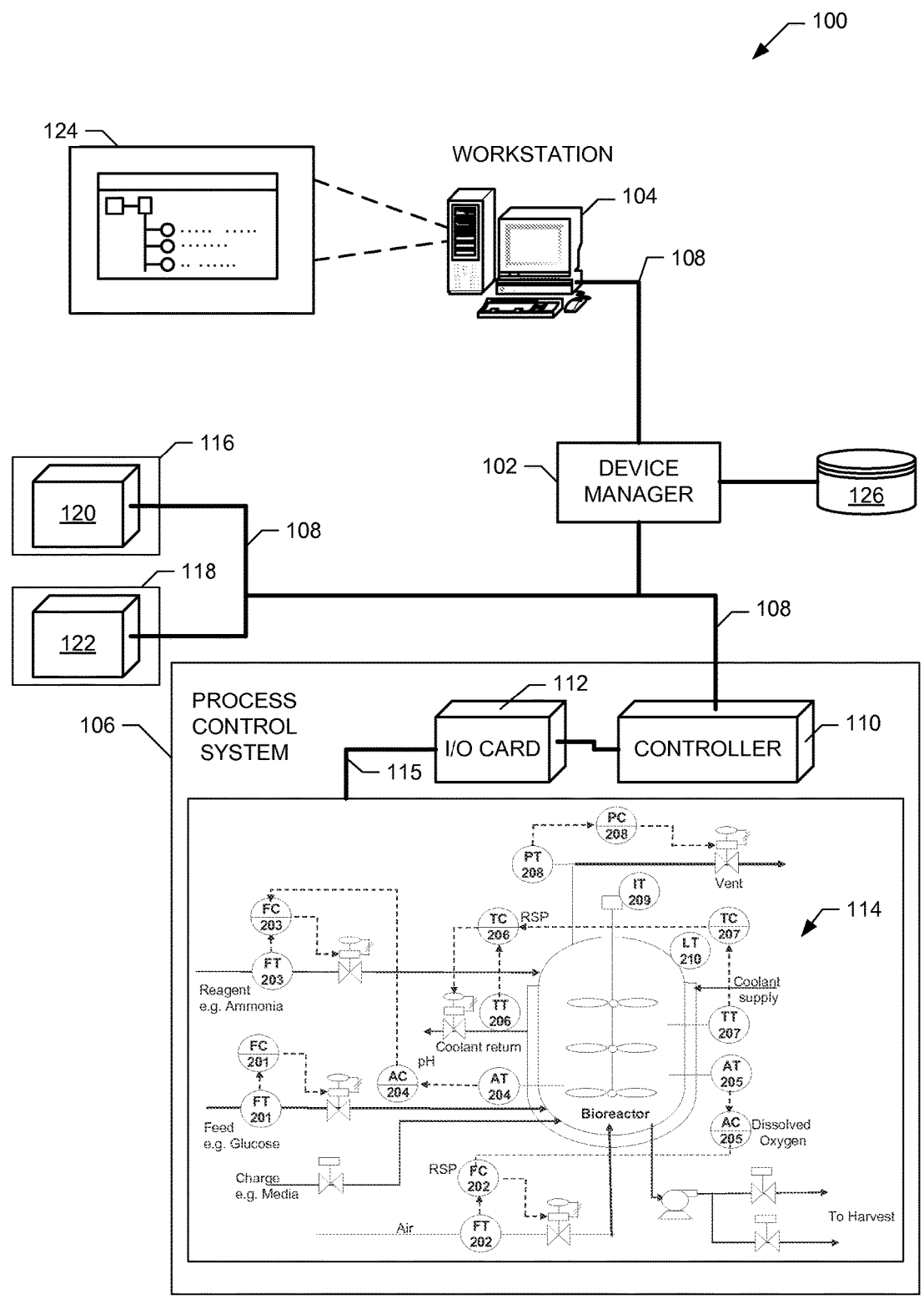
FIG. 1 shows a diagram of an example process control environment including an example device manager that maybe used to carry out the example methods and apparatus described herein.

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus. For example, while the example methods and apparatus are described in connection with managing process control resources of a process control system, the example methods and apparatus are more generally applicable and may be implemented to manage process control resources within any automation system, batch processing system, manufacturing system, industrial control system, safety instrumented system, etc.

Process control systems generally include controllers to perform routines, control strategies, and/or algorithms that manage field devices located in the control system. The field devices may be, for example, valves, valve positioners, switches and transmitters, and may perform process control functions such as opening or closing valves and measuring process control parameters. In addition to managing field devices, controllers may generate process data (e.g., process control information) based on information received from the field devices. The process data may include process statistics, alarms, monitoring information, process trend information, diagnostic information, field device status information, and/or messages from the field devices.

Controllers transmit process data to applications operating on hosts (e.g., workstations, computers, tablet computers laptops, servers, handheld devices, portable devices, wireless devices, smartphones, and/or any other computing device) so that operators may manage a process control system. Typically, applications display process data as at least one graphical data representation in a user interface. Data representations are helpful to operators as these data representations typically display process data graphically in the form of charts, graphs, data tables, list boxes, graphical symbols, text, etc. The data representations and corresponding text within the user interface are generally displayed in a format and/or language associated with a locale of an operator viewing the information.

In many known process control environments, process control personnel utilize asset management tools to manage field devices, controllers, I/O cards, and/or any other components within a process control system. The field devices, controllers, I/O cards, servers, computers, processors, groups of devices, documents, process control personnel, and/or other components are referred to herein as process control resources. Asset management tools enable process control personnel to view setup information, configuration information, device feature information, and/or output process data from the process control resources. Further, many common asset management tools enable process control personnel to control the process control resources via an interface displayed on a host and/or workstation with control functionality.

Currently, many asset management tools order and/or structure process control resources in a hierarchical arrangement based on a physical coupling and/or location of resources within a process control system. In one example, a hierarchical structure may have a first hierarchical level that corresponds to a process control plant location, a second hierarchical level that corresponds to an area within the process control plant, a third hierarchical level that corresponds to a controller within the area, a fourth hierarchical level that corresponds to an I/O card communicatively coupled to the controller, and a fifth hierarchical level that corresponds to field devices communicatively coupled to the I/O card. In another example, the hierarchical structure may be based on coupling of resources grouped within functional areas. For example, a first hierarchical level may include a process control plant, a second hierarchical level may correspond to water processing functions, a third hierarchical level may correspond to a salination function, a fourth hierarchical level may correspond to controllers associated with the salination function, and a fifth level may correspond to field devices communicatively coupled to each of the controllers associated with the salination function.

Process control personnel that want to view information associated with a field device have to manually navigate though the hierarchical structure until the desired field device is located. In particular, the process control personnel have to know which plant, which area within the plant, relationships between functional areas, connectors of controllers, and/or connectors of I/O cards to locate a particular field device. This navigating to a specific device is relatively time consuming and inefficient. Further, the hierarchical structure requires that process control personnel have prior knowledge of where resources are located and how resources are coupled together. As more process control environments rely on distributive computing and management of resources by remote personnel (e.g., operators that are located some distance from the process control environment), there is an increasing likelihood that many process control personnel do not have knowledge of where particular field devices may be located.

Some known systems enable process control personnel to search for a particular resource. However, the process control personnel need enough identifying information to locate the resource. Further, it can become redundant and/or inefficient for process control personnel to frequently and repeatedly search for desired resources. Other known systems enable personnel to configure an interface to view diagnostics, statuses, and/or outputs from resources. However, many of these interfaces display information for controlling the resources and may not include information describing the resources and/or information associated with managing the resources.

The example methods and apparatus described herein enable process control personnel to manage process control resources by creating logical containers. The example logical containers are customizable software and/or data structures that enable process control personnel to group and/or associate resources based on preferences of the personnel. The example logical containers may be included within asset management tools to provide customizable structures for grouping process control resources. In some instances, logical containers may be a partition of memory that stores a list of process control resources specified by process control personnel. In other instances, the logical containers may be a partition and/or group within an asset management tool (e.g., asset management software) that includes a list of process control resources specified by process control personnel. In yet other examples, the logical containers may be files that store a list and/or identifiers of associated process control resources.

The example methods and apparatus described herein create logical containers based on requests from process control personnel to group resources based on preferences and/or a common characteristic. A common characteristic may include, for example, a fault type, an issue history, a type of resource, a physical location, a manufacturer, a calibration date (and/or date range), an installation date (and/or date range), a communication type, etc. Alternatively, process control personnel may create logical containers based on personal preferences. For example, an operator may create a logical container for resources assigned to the operator to monitor and/or maintain. In another example, an operator may create a logical container based on favorite and/or most accessed process control resources. In this manner, the methods and apparatus described herein enable process control personnel to create relatively arbitrary groupings of process control resources.

After creating a logical container, the example methods and apparatus described herein enable process control personnel to select process control resources to assign to the logical container. To add a process control resource to a logical container, the example methods and apparatus described herein create an entry within the logical container for the resource that links to information associated with and/or generated by the resource. The entry may include a name of the resource and/or any other identifying information. Further, the entry may include an icon that indicates a type of the resource and/or text that describe the resource. Thus, the resource entry is a shortcut to information associated with the process control resource, the creation of a resource entry does not change properties of the resource and/or change how the resource is connected within a process control environment. Additionally, because the resource entry is a shortcut, process control personnel can create multiple entries for the same process control resource stored to different logical containers.

The example methods and apparatus described herein enable process control personnel to recall previously created logical containers to relatively easily locate process control resources. In some examples, the methods and apparatus described herein enable process control personnel to access logical containers created by other individuals. Additionally, the example methods and apparatus enable process control personnel to search for a process control resource to determine which logical containers include the resource. Process control personnel may use this information to classify the process control resource and/or identify patterns regarding the resource. For example, a process control resource that is included within numerous logical containers for problematic devices may be flagged for inspection to determine if the resource should be replaced and/or serviced. In this manner, the methods and apparatus described herein enable process control personnel to use logical containers to classify and/or identify resource functional patterns to improve operation of process control environments.

Further, the example methods and apparatus described herein enable process control personnel to associate process control items (e.g., documents, process control resources, workflows, schedules, etc.) to process control resources within a logical container. For example, a process control operator may associate a safety document to a field device process control resource within a logical container. The operator associates the safety document to the field device by dragging-and-dropping an icon of the safety document to an icon of the field device resource within the logical container. Upon associating the safety document with the field device resource, the operator may access the safety document by selecting the field device resource. The example methods and apparatus described herein may then prompt the operator to determine if other resources included within the same logical container are to be associated with the safety document.

In some examples, the example methods and apparatus described herein display process control resources of selected logical containers within a pictorial representation of a process control environment, plant, and/or area. Each of the process control resources may include location information that the example methods and apparatus use to determine a corresponding location on the pictorial representation. A pictorial representation may include a picture and/or photograph of a process control area. Additionally, a pictorial and/or graphical representation may include a picture, a diagram, a schematic, a layout, a rendering, a map, and/or a photograph.

The example methods and apparatus display icons representative of process control resources in proximity to locations of the resources on the pictorial representation. In some instances, process control personnel may select a logical container to view locations of associated process control resources within a pictorial representation. In this manner, the example methods and apparatus described herein enable process control personnel to view locations of process control resources within a pictured area. Some process control personnel may use the pictured location information to physically locate process control resources. In other examples, process control personnel may use the pictured location information to determine which process control resources should be managed based on conditions in certain areas of a process control system.

FIG. 1 shows a diagram of an example process control environment 100 including an example device manager 102 that maybe used to carry out the example methods and apparatus described herein. The process control environment 100 also includes a workstation 104 to enable process control personnel to interface with the device manager 102 for managing process control resources within logical containers. While the example process control environment 100 shows the example workstation 104, the environment 100 may include additional workstations communicatively coupled to the example device manager 102. In other examples, the device manager 102 may be included within the workstation 104 or, alternatively, the device manager 102 may be included within a server and/or processor of the process control environment 100.

The example device manager 102 is communicatively coupled to the workstation 104 and a process control system 106 via a local area network (LAN) 108. The LAN 108 may be implemented using any communication medium and/or protocol. For example, the LAN 108 may be based on a hardwired or wireless Ethernet communication scheme. However, any other suitable communication medium and protocol could be used. Furthermore, although the LAN 108 is shown, more than one LAN and appropriate communication hardware within the process control environment 100 may be used to provide redundant communication paths between the workstation 104 and other workstations (not shown).

The example workstation 104 of FIG. 1 may include any computing device such as a personal computer, a tablet computer, a laptop, a server, a handheld device, a portable device, a wireless device, a smartphone, etc. The workstation 104 may be implemented using any suitable computer system or processing system (e.g., the processor system P10 of FIG. 10). For example, the workstation 104 could be implemented using a single processor personal computer, single or multi-processor workstations, etc.

The example process control system 106 includes a controller 110, an I/O card 112, and field devices 114 (e.g., process control resources). The controller 110 and/or the I/O card 112 are communicatively coupled to the field devices 114 via a communication path 115. The example communication path 115 may conform to any wired and/or wireless process control communication protocol including, for example, Foundation Fieldbus™, Hart®, and/or Profibus®.

The example controller 110 uses control routines to calculate process data based on outputs from the field devices 114 for applications including, for example, monitoring applications, alarm management applications, process trending and/or history applications, diagnostic applications, batch processing and/or campaign management applications, statistical applications, streaming video applications, advanced control applications, safety instrumented applications, event applications, asset management applications, etc. The controller 110 forwards process data to the workstation 104 and/or any process control databases, servers, and/or processors (not shown) at periodic intervals and/or upon processing or generating the process data. The process data transmitted by the controller 110 may include process control values, data values, alarm information, text, block mode element status information, diagnostic information, error messages, parameters, events, and/or device identifiers.

The example I/O card 112 (e.g., one or more I/O cards) receives data from the field devices 114 and converts the data into communications capable of being processed by the example controller 110. Likewise, the I/O card 112 may convert data or communications from the controller 110 into a data format capable of being processed by the field devices 114.

The example process control system 106 of FIG. 1 may include any type of manufacturing facility, process facility, automation facility, safety instrumented facility, and/or any other type of process control structure or system. In some examples, the process control system 106 may include multiple facilities located at different locations within the process control environment 100. In other examples, the process control system 106 of FIG. 1 may include additional controllers and/or I/O cards. Additionally, the process control system 106 may include additional or fewer field devices.

The example field devices 114 are components that monitor, analyze, and manage one or more processes. The field devices 114 may include, for example, valves, pumps, fans, heaters, coolers, and/or mixers to control a process. Additionally, the field devices 114 may include measurement or monitoring devices such as, for example, temperature sensors, pressure sensors, concentration sensors, fluid level meters, flow meters, and/or vapor sensors to measure portions of a process. Generally, the field devices 114 receive instructions from the controller 110 via the communication path 115 to execute specified operations (e.g., measure a pressure of a fluid). The example field devices 114 use instructions from the controller 110 to cause a change to processes implemented and/or controlled by the field devices 114 (e.g., regulate the pressure of the fluid). The field devices 114 measure process data, environmental data, and/or input device data and transmit the measured data via the communication path 115 to the controller 110 as process data.

In the example of FIG. 1, the process control environment 100 includes additional process control systems 116 and 118 that may be physically separate from the process control system 106. For example, the process control systems 116 and 118 could be separate areas. The example process control systems 116 and 118 include respective controllers 120 and 122 that are communicatively coupled to I/O cards and field devices (not shown). The example device manager 102 and/or other process control computing devices are communicatively coupled to the process control systems 116 and 118 via the LAN 108. In this manner, the device manager 102 enables users (e.g., process control personnel) of the workstation 104 to access and/or manage process control resources (e.g., the field devices 114, the controllers 110, 120, and 122, and the I/O card 112) regardless of a location of the resources.

The example workstation 104 displays process control applications via a user interface 124. The process control applications include asset management applications to enable process control personnel to view information associated with the field devices 114. The asset management applications may also display a pictorial and/or graphical representation of the process control system 106. Additionally, the example user interface 124 enables process control personnel to interact and/or manage the process control system 106 by providing graphical instrumentality (e.g., via the process control applications) that the personnel may select and/or manipulate to cause the workstation 104 to send instructions to the controller 110.

The example device manager 102 of FIG. 1 provides an interface for process control personnel to view and manage process control resources within the process control environment 100. The example device manager 102 maintains logical containers of process control resources based on preferences of process control personnel. Additionally, the example device manager 102 manages and/or provides access to information regarding process control resources including, calibration information, diagnostic information, physical location information, communication protocol information, manufacturer information, and/or any other type of information that may be associated with a process control resource. In some instances, the information may include links to process data from, for example, the controller 110 and which is generated by a corresponding process control resource (e.g., the field devices 114). The example device manager 102 accesses this information from, for example, a resource database 126.

The example controllers 110, 120 and/or 122 may store process data to the resource database 126. Additionally, process control personnel may store process control resource information to the resource database 126. While the resource database 126 is shown in FIG. 1, the process control environment 100 may include additional databases, servers, and/or memories for storing process control resource information. Alternatively, the resource database 126 may be included within the workstation 104. The example resource database 126 may be implemented by Electronically Erasable Programmable Read-Only Memory (EEPROM), Random Access Memory (RAM), Read-Only Memory (ROM), and/or any other type of memory.

The example device manager 102 may also provide a default hierarchal structure of process control resources based on locations and/or connections of the resources. The hierarchical structure may be created based on the device manager 102 determining relationships among the process control resources and locations of the process control resources. For example, the device manager 102 may provide a first hierarchical level for the process control environment 100, a second hierarchical level for each of the process control systems 106, 116, and 118, a third hierarchical level for the controllers 110, 120, and 122, and a fourth hierarchical level for the field devices 114. Process control personnel may use this default hierarchical structure to select process control resources to add to logical containers. Alternatively, process control personnel may use the device manager 102 to search the resource database 126 for process control resources to add to logical containers.

The example device manager 102 of FIG. 1 also enables process control personnel to create logical containers based on common characteristics and/or personal preferences. For example, process control personnel may create logical containers for process control resources that have similar issues, for assigned process control resources, favorite process control resources, etc. The device manager 102 partitions the example resource database 126 for each logical container. For each resource added to a logical container, the device manager 102 creates an entry within the logical container with an icon and/or other identifying text to represent the added resource. The example device manager 102 then links the icon and/or identifying text to the information associated with the resource within the resource database 126. In other words, the device manager 102 creates a shortcut in the logical container for each process control resource to process data and other process control resource information within the resource database 126. In some examples, the device manager 102 may store logical containers locally to the workstation 104 that link to corresponding process control resources within the resource database 126. In this manner, process control personnel can create multiple logical containers that reference the same process control resources.

The example device manager 102 of the illustrated example creates graphical and/or pictorial representations of the process control environment 100 and/or the process control systems 106, 116, and/or 118 that include locations of process control resources. The device manager 102 then displays these pictorial and/or graphical representations on, for example, the workstation 104 via the user interface 124. In some examples, a process control designer may create and/or generate a picture, map, schematic, photograph, and/or any other pictorial and/or graphical representation of, for example, the process control system 106.

The example device manager 102 receives the pictorial representation and creates a grid and/or coordinate mapping for the pictorial representation. In some instances, the grid and/or coordinate mapping may be associated with global positioning system (GPS) coordinates and/or latitude/longitude coordinates. In other examples, the grid and/or coordinate mapping may be associated with a location system designed, for example, for the process control environment 100. The example device manager 102 accesses the resource database 126 for location information associated with process control resources, and uses the location information to determine where icons and/or other identifying information is to be displayed on the pictorial representation to accurately represent locations of the resources. The locations of the resources on the pictorial representation may be stored as a mapping file that can be executed in conjunction with logical containers when process control personnel access a pictorial and/or graphical representation.

Additionally, the example device manager 102 of FIG. 1 uses logical containers in conjunction with mapping files to display selected process control resources on a pictorial representation. For example, an operator may select to view process control resources associated with a logical container called 'Favorites.' The example device manager 102 determines which process control resources are included within the 'Favorites' logical container and displays only those resources on the pictorial representation in accordance with the location information stored in the mapping file(s).

The example device manager 102 also enables process control personnel to associate process control items and/or process control resources with other process control resources. For example, the device manager 102 may associate a document with all process control resources in a logical container that includes a resource that has been selected to be associated with the document. Further, the example device manager 102 enables process control personnel to search for and identify logical containers including certain process control resources. Process control personnel may then use the types of identified logical containers to identify properties and/or operational patterns of the process control resources.

Figure 2:
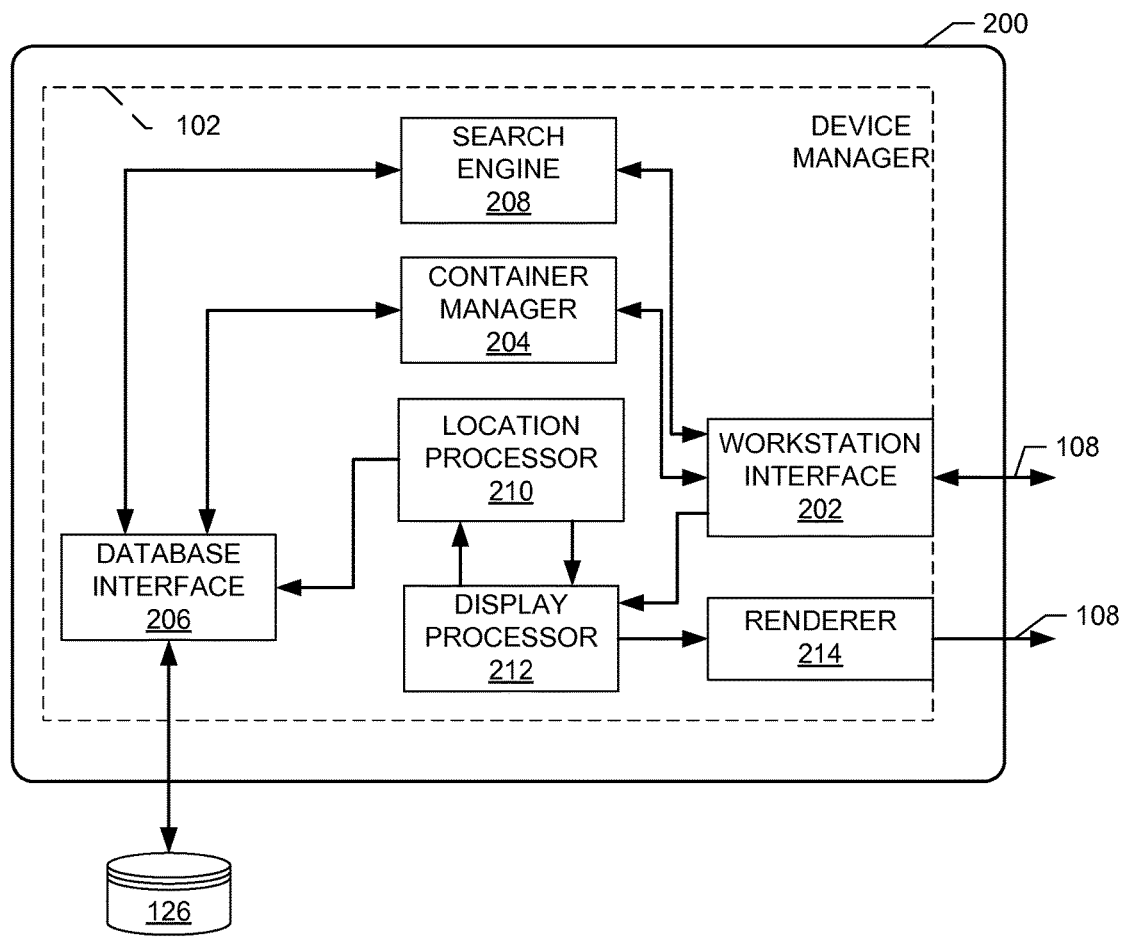
FIG. 2 shows a functional block diagram of the example device manager of FIG. 1.

FIG. 2 shows a functional block diagram of the example device manager 102 of FIG. 1. In this example, the device manager 102 is shown included within a server 200. In other examples, the device manager 102 may be included within a processor, a computer, and/or another other computing device. While the device manager 102 is shown directly communicatively coupled to the LAN 108, in other examples the device manager 102 may be coupled to other types of communication paths. In some examples, the server 200 may include multiple device managers 102 to support concurrent management of logical containers and the display of process control resources.

To provide an interface for process control personnel to create and/or modify logical containers, the example device manager 102 of FIG. 2 includes a workstation interface 202. The example workstation interface 202 provides functionality for process control personnel to interact with logical containers and/or process control resources via the device manager 102. In some examples, the workstation interface 202 may interface with an asset management application on the workstation 104 to receive instructions and/or requests from process control personnel. In other examples, the workstation interface 202 may function as an application programming interface between asset management tools and/or functions for managing logical containers and/or process control resources. In yet other examples, the workstation interface 202 may host an application for process control personnel to access via the workstation 104 to view, create, and/or modify process control resources within logical containers.

To manage process control resources and/or logical containers, the example device manager 102 of FIG. 2 includes a container manager 204. The example container manager 204 receives selections of process control resources via the workstation interface 202 and associates those resources with requested logical containers. The container manager 204 may receive an indication of a logical container that is to receive process control resources by receiving an indicator and/or a name of the logical container and names of the process control resources from the workstation interface 202. To select process control resources, process control personnel may search for the resources, navigate to the resources using a file browser, and/or navigate to the resources through a hierarchical structure.

The example container manager 204 creates entries within a logical container for each assigned process control resource by storing an identifier of the resource in the logical container. In some examples, the identifier may include a name, identifying text, and/or an icon representative of the process control resources. The container manager 204 may then search the resource database 126 via a database interface 206 for process control resource information that is to be linked to an entry. After locating process control resource information, the container manager 204 adds a link to the entry, thereby creating a shortcut between the process control resources and associated process control resource information (e.g., process data). The example container manager 204 may then transmit the logical container with the newly created process control resource entries to the database interface 206 for storage within the resource database 126. In this manner, the example container manager 204 enables process control personnel to locate process control resources using personally created logical containers without having to know or memorize a resource hierarchy of the process control system.

The example container manager 204 also enables process control personnel to create logical containers. To create a logical container, the container manager 204 prompts process control personnel, via the workstation interface 202, for a name of the container, an identifier for the container, a characteristic of the container, and/or a directory location for the container. The directory location may indicate if the logical container is to be nested within another logical container or may indicate if the logical container is to be included within a relatively high level structure within, for example, an asset management tool.

A characteristic selected by process control personnel may be any feature, function, location, and/or property of a process control resource including for example, a fault type, a history of common issues, a type of resource, a physical location, a user preference, a manufacturer, a calibration date, an installation date, and/or a communication type. In some instances, process control personnel may create a logical container with a common characteristic of process control resources assigned to the personnel or, alternatively, resources of interest to the personnel. In this manner, the example container manager 204 enables process control personnel to organize process control resources based on preferences separate or distinct from how the resources are provisioned and/or communicatively coupled.

After prompting process control personnel for information to create a logical container, the example container manager 204 partitions space within, for example, the resource database 126 for the logical container. The example container manager 204 uses the partitioned space for storing entries with identifiers of process control resources associated with the logical container. The container manager 204 also uses the partitioned space for storing information describing the logical container. In other examples, the container manager 204 may partition memory space within an asset management tool and/or application for the logical container.

The example container manager 204 also manages logical containers by enabling process control personnel to modify which process control items and/or resources are associated with resources within logical containers. A process control item may include any process control resource, document, and/or process control information that may be assigned to process control resources. For example, the workstation interface 202 may receive an indication that a process control item was selected to be associated with (e.g., dragged-and-dropped onto) a process control resource within a logical container. The example container manager 204 identifies the logical container, the process control resource, and the process control item. The example container manager 204 then associates the process control item with the process control resource by including a link to the item within the entry for the process control resource. The example container manager 204 may then prompt the process control personnel to determine if the process control item is to be associated with the other process control resources in the logical container. Based on a response from the personnel, the container manager 204 may then associate the process control item with the other resources. In some instances, the process control personnel may select which of the process control resources within the logical container are to be associated with the item.

In some examples, the example container manager 204 associate a process control item with process control resources based on a type of the item. For example, the container manager 204 enables (e.g., associates) a document process control item to be selectable when process control personnel view a field device process control resource. In another example, the container manager 204 may assign (e.g., associate) a field device process control item to work schedules of engineer process control resources within a logical container. In another example, an alarm process control item assigned (e.g., associated) with a field device process control resource may be configured by the container manager 204 as an alarm on other resources within the logical container.

The example device manager 102 of FIG. 1 also includes a search engine 208 to process search requests from process control personnel via the workstation interface 202. The search requests instruct the search engine 208 to determine which logical containers include a specified process control resource. To identify logical containers, the example search engine 208 sends an instruction to the database interface 206 to retrieve logical containers from the resource database 126. The example search engine 208 then searches the logical containers for entries with identifiers that match the requested process control resource. The example search engine 208 then returns the search results to the workstation interface 202 for display via the user interface 124.

In some instances, the example search engine 208 may also analyze the search results to determine any patterns and/or trends based on which logical containers include a process control resource. For example, the search engine 208 may determine that a field device resource is included within many logical containers labeled as 'Problem Devices,' 'Issues,' and 'Watch List.' Based on these labels, the search engine 208 may determine that the field device resource has frequent issues. The example search engine 208 may then flag the field device process control resource for an inspection and/or repair. In other examples, the search engine 208 may determine that some logical containers are to include a process control resource and may prompt process control personnel to add the process control resource to relevant logical containers.

The example device manager 102 includes the example database interface 206 to store and/or retrieve logical containers and/or process control resource information from, for example, the resource database 126. The example database interface 206 may also provide an interface for the device manager 102 to access and search the resource database 126 for process control resources, logical containers, and/or process control resource information. Further, the example database interface 206 may enable the device manager 102 to retrieve pictorial and/or graphical representations of process control systems that may be stored in the resource database 126 and/or any other server within, for example, the process control environment 100.

To associate locations of process control resources with a location of a pictorial and/or graphical representation of a process control system, the example device manager 102 includes a location processor 210. The example location processor 210 receives a pictorial and/or graphical representation from process control personnel via the workstation interface 202 or, alternatively, from the resource database 126. The pictorial representation may include a photograph of a process control system (e.g., the process control systems 106, 116, and/or 118). In other examples, the pictorial and/or graphical representation may include a rendering, a map, a drawing, and/or any other type of schematic of a process control system.

The example location processor 210 of FIG. 2 analyzes the pictorial representation and creates a grid and/or coordinate system for the pictorial representation. In some examples, the location processor 210 may use GPS and/or latitude/longitude coordinates for the pictorial representation. In other examples, process control personnel may use a site-specific location coordinate system. In these examples, the location processor 210 applies the specific coordinate system to the pictorial representation.

The example location processor 210 accesses process control resource information from the resource database 126 to determine locations of process control resources. In some examples, the location of a process control resource is specified in a device description file and/or other provisioning file when the resource is installed within a process control system. The example location processor uses this information to determine a corresponding location of the process control resource on the coordinate system of the pictorial and/or graphical representation.

After determining where process control resources are located on a pictorial representation, the example location processor 210 selects a location on the pictorial representation in proximity to the determined location to display icons and/or other identifying information associated with the resources. The example location processor 210 may then create a map file with entries for each of the process control resources that reference locations on the pictorial representation. The entries may also include links to corresponding process control resource information. For example, the location processor 210 may determine from a provisioning file that a field device process control resource is located at coordinates 'ab.cd' by 'yy.zz.' The location processor 210 identifies the 'ab.cd' by 'yy.zz' coordinates on the pictorial representation and stores in a map file where on the pictorial representation the process control resource is to be displayed.

The location processor 210 of the illustrated example also manages which process control resources are displayed on a pictorial and/or graphical representation based on process control personnel selecting a logical container. For example, the location processor 210 may receive an identifier of a logical container requested by an operator via the workstation interface 202. The location processor 210 identifies the logical container in the request and accesses the resource database 126 via the database interface 206 for the logical container. The example location processor 210 determines which process control resources are included within the logical container and uses a map and/or coordinate file to determine locations of those resources on a pictorial and/or graphical representation. The example location processor 210 instructs a display processor 212 to display identifiers of the process control resources on the pictorial and/or graphical representation. In this manner, process control personnel can select a logical container to view associated process control resources on a pictorial and/or graphical representation without having to individually select which resources are to be displayed. Thus, the example location processor 210 may save process control personnel time by enabling the process control personnel to relatively quickly display locations of grouped resources on a pictorial representation.

To prepare process control resources for display, the example device manager 102 includes the display processor 212. The example display processor 212 receives instructions from the location processor 210 for displaying icons and/or other identifying information associated with process control resources on a pictorial and/or graphical representation. The example display processor 212 formats the icons and/or identifying information into displayable data structures or objects that are readable by process control personnel. Further, the display processor 210 creates a display file that indicates which displayable information and/or icons are to be displayed in which locations of a pictorial and/or graphical representation.

For example, the display processor 212 may determine that 20 process control resources are to be displayed at one location. The example display processor 212 may consolidate the display of the 20 resources by creating a scrollable resource box that includes the 20 resources. The resource box may only obscures a portion of the graphical and/or pictorial representation. In this manner, the display processor 212 ensures that process control resources are displayed on a pictorial and/or graphical representation in a readable manner.

To display a pictorial and/or graphical representation with process control resources, the example device manager 102 includes a renderer 214. The example renderer 214 receives a display file from the display processor 212 and renders the information within the user interface 124. The example renderer 214 may also display logical containers within a pictorial and/or graphical representation or, alternatively, display logical containers within an asset management tool.

While the example device manager 102 has been illustrated in FIG. 2, one or more of the servers, platforms, interfaces, data structures, elements, processes and/or devices illustrated in FIG. 2 may be combined, divided, re-arranged, omitted, eliminated and/or implemented in any way. Further, the example workstation interface 202, the example container manager 204, the example database interface 206, the example search engine 208, the example location processor 210, the example display processor 212, the example renderer 214, the example resource database 126 and/or, more generally, the example device manager 102 may be implemented by hardware, software, firmware and/or any combination of hardware, software and/or firmware. Thus, for example, any of the example workstation interface 202, the example container manager 204, the example database interface 206, the example search engine 208, the example location processor 210, the example display processor 212, the example renderer 214, the example resource database 126 and/or, more generally, the example device manager 102 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any apparatus claim of this patent is read to cover a purely software and/or firmware implementation, at least one of the example workstation interface 202, the example container manager 204, the example database interface 206, the example search engine 208, the example location processor 210, the example display processor 212, the example renderer 214, and/or the example resource database 126 are hereby expressly defined to include a tangible computer readable medium such as a memory, DVD, CD, etc. storing the software and/or firmware. Further still, the example device manager 102 may include one or more elements, processes and/or devices in addition to, or instead of, those illustrated in FIG. 2, and/or may include more than one of any or all of the illustrated elements, processes and devices.

Figure 3:
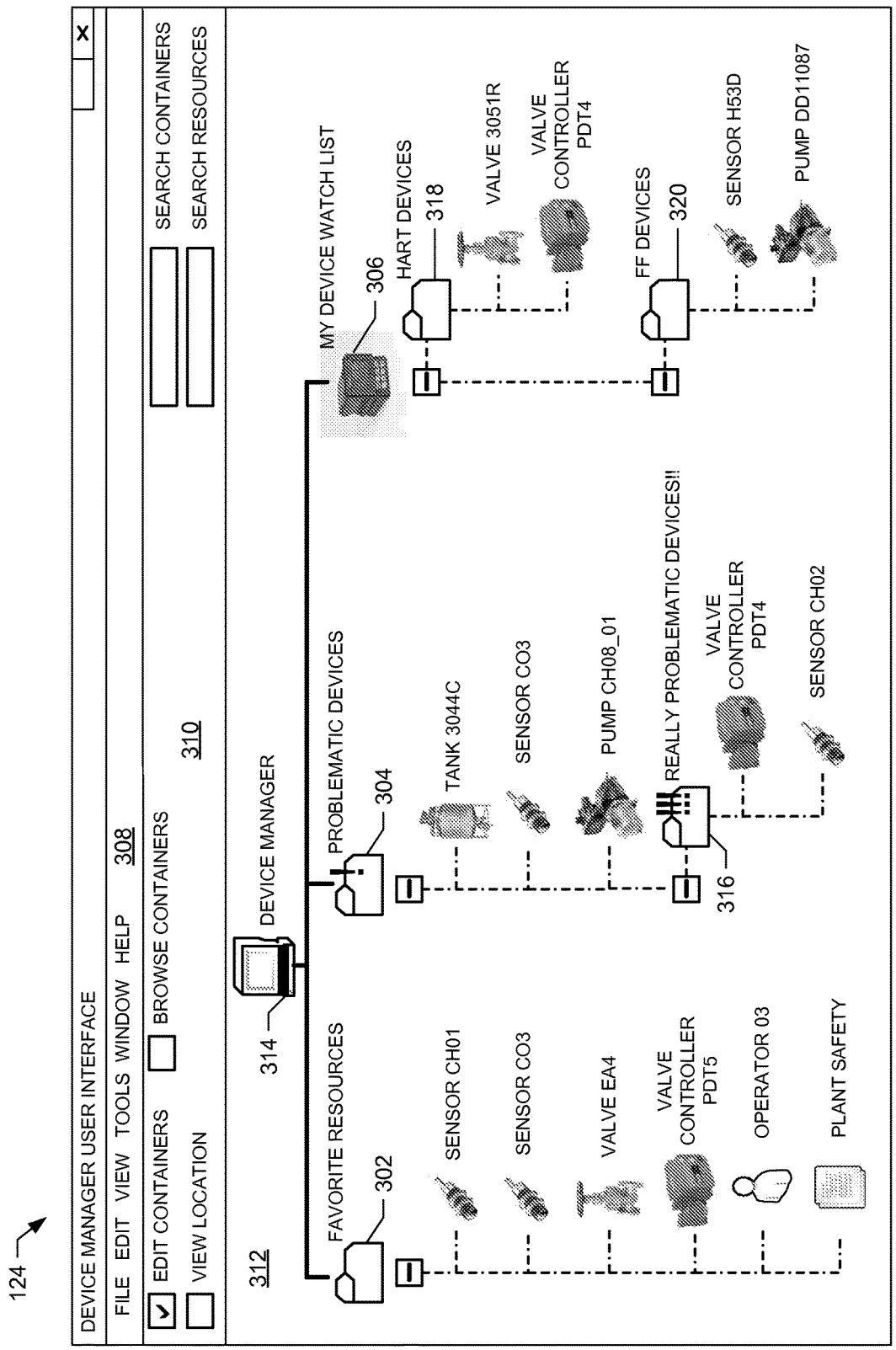
FIGS. 3-5 show an example user interface displaying logical containers.

FIG. 3 shows the example user interface 124 of FIG. 1 displaying logical containers 302-306. The example user interface 124 also includes a menu bar 308, a search panel 310, and a logical container panel 312. The example menu bar 308 enables process control personnel to edit, create, and/or modify logical containers. The example search panel 310 also enables process control personnel to search for process control resources and/or logical containers.

In the example of FIG. 3, the search panel 310 includes options for editing logical containers (e.g., 'Edit Containers'), viewing locations of process control resources (e.g., 'View Location'), and browsing for process control resources within logical containers (e.g., Browse Containers'). The example search panel 310 includes search fields to instruct the device manager 102 of FIGS. 1 and 2 to search for a specified process control resource within logical containers (e.g., 'Search Container') and search for a specified process control resource within process control databases (e.g., 'Search Resource'). In other examples, the search panel 310 may include additional or fewer functions.

The example logical container panel 312 of the illustrated example shows a device manager tool 314 that enables process control personnel to manage process control resources (e.g., assets). In this example, the device manager tool 314 includes the logical containers 302-306 created by, for example, a process control operator to manage process control resources. The operator may specify that the logical containers 302-306 are to be displayed upon opening and/or selecting the device manager tool 314. In other examples, the device manager tool 314 may include additional, fewer, and/or different types of logical containers based on preferences of process control personnel.

Process control personnel may manage process control resources using the device manager tool 314 by selecting a desired process control resource to view information associated with that process control resource. For example, process control personnel may select the Sensor CH01 process control resource to cause the device manager 102 to display within the user interface 124 diagnostic information, calibration information, monitoring information, etc. associated with the Sensor CH01. Additionally, the user interface 124 may display a list of documents associated with the Sensor CH01 and/or a list of process control personnel assigned to the Sensor CH01. In other examples, selecting the Sensor CH01 within the device manager tool 314 may cause the user interface 124 to display any process control application that includes the Sensor CH01.

In this example, the process control resources are listed using a text name of the resource and an icon representing a type of the resource. In other examples, the process control resources may be displayed using serial numbers associated with the resources. Alternatively, the process control resources may be displayed using names assigned by process control personnel.

In the example of FIG. 3, a process control user (e.g., an operator) creates the logical containers 302-306 based on preferences of the user. This example also shows that the process control user may group process control resources based on a common characteristic. For example, the user creates the Favorite Resources logical container 302 to include process control resources that the user may monitor frequently. The user creates the Problematic Devices logical container 304 for process control resources that the user has to troubleshoot and/or repair frequently. Additionally, the user creates the My Device Watch List logical container 306 for process control resources that are assigned to an area of control of the user.

The example in FIG. 3 shows that logical containers (e.g., the logical containers 302-306) may include field device process control resources in addition to documents and personnel. For example, the Favorite Resources logical container includes the Operator 03 process control resource and the Plant Safety Document process control resource. Further, the example user interface 124 of FIG. 3 shows that the same process control resource may be included within multiple logical containers. For example, the Sensor CO3 process control resource is included within the logical containers 302 and 304.

Further, the example in FIG. 3 shows that logical containers may be nested to enable process control personnel to further organize process control resources. For example, the Problematic Devices logical container 304 includes a Really Problematic Devices logical container 316. This logical container 316 may include process control resources that are troubleshoot and/or repaired more frequently than the process control resources within the Problematic Devices logical container 304. Further, the My Device Watch List logical container 306 includes a Hart Devices logical container 318 and a Foundation Fieldbus (FF) devices logical container 320. The logical containers 318 and 320 enable process control personnel to organize process control resources by a communication protocol type within the My Device Watch List logical container 306.

Process control personnel may edit the logical containers 302-306 and 316-320 by searching for a process control resource via the 'Search Resources' function within the search panel 310. The example device manager 102 returns a list of matching resources that process control personnel may select to add to the logical containers 302-306 and 316-320. In other examples, process control personnel may request to view a default hierarchical structure of a process control system to locate a desired resource to add to the logical containers. Further, the example device manager 102 enables process control personnel to remove process control resources from the logical containers 302-306 and 316-320 and/or to move process control resources from one logical container to another logical container (e.g., from the logical container 302 to the logical container 304).

Figure 4:
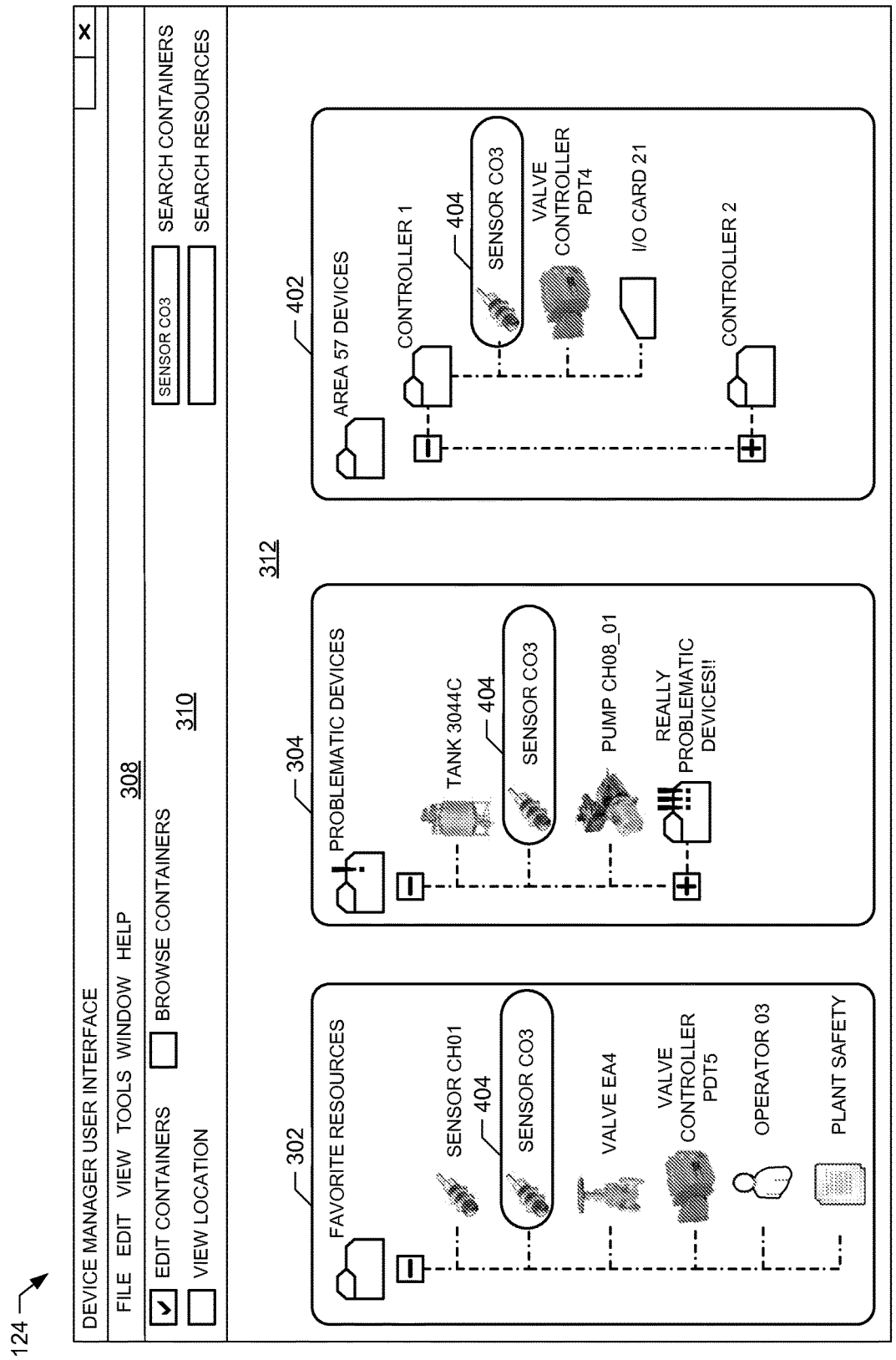

FIG. 4 shows the example user interface 124 of FIG. 3 displaying logical container search results for the Sensor CO3 process control resource. In this example, a process control operator enters 'Sensor CO3' into the Search Containers field of the search panel 310 causing the example device manager 102 of FIGS. 1 and 2 to search logical containers for the Sensor CO3 process control resource. In this example, the device manager 102 indicates that the Sensor CO3 process control resource is included within the Favorite Resources logical container 302, the Problematic Devices logical container 304, and an Area 57 Devices logical container 402. The example user interface 124 displays the search results by showing the logical containers 302, 304, and 402 as separate structures within the logical container panel 312.

The example logical containers 302, 304, and 402 show the Sensor CO3 process control resource highlighted 404. The example device manager 102 may use the type of the logical containers 302, 304, and/or 402 to determine any patterns of operation for the Sensor CO3 process control resource. For example, the device manager 102 may infer from the logical containers 302, 304, and/or 402 that the Sensor CO3 is a field device of concern to be examined within process control area 57. The example device manager 102 may then alert process control personnel to examine and/or replace the Sensor CO3 process control resource. In other examples, process control personnel may use the types of the logical containers 302, 304, and/or 402 to determine operational patterns associated with the Sensor CO3 resource.

Figure 5:
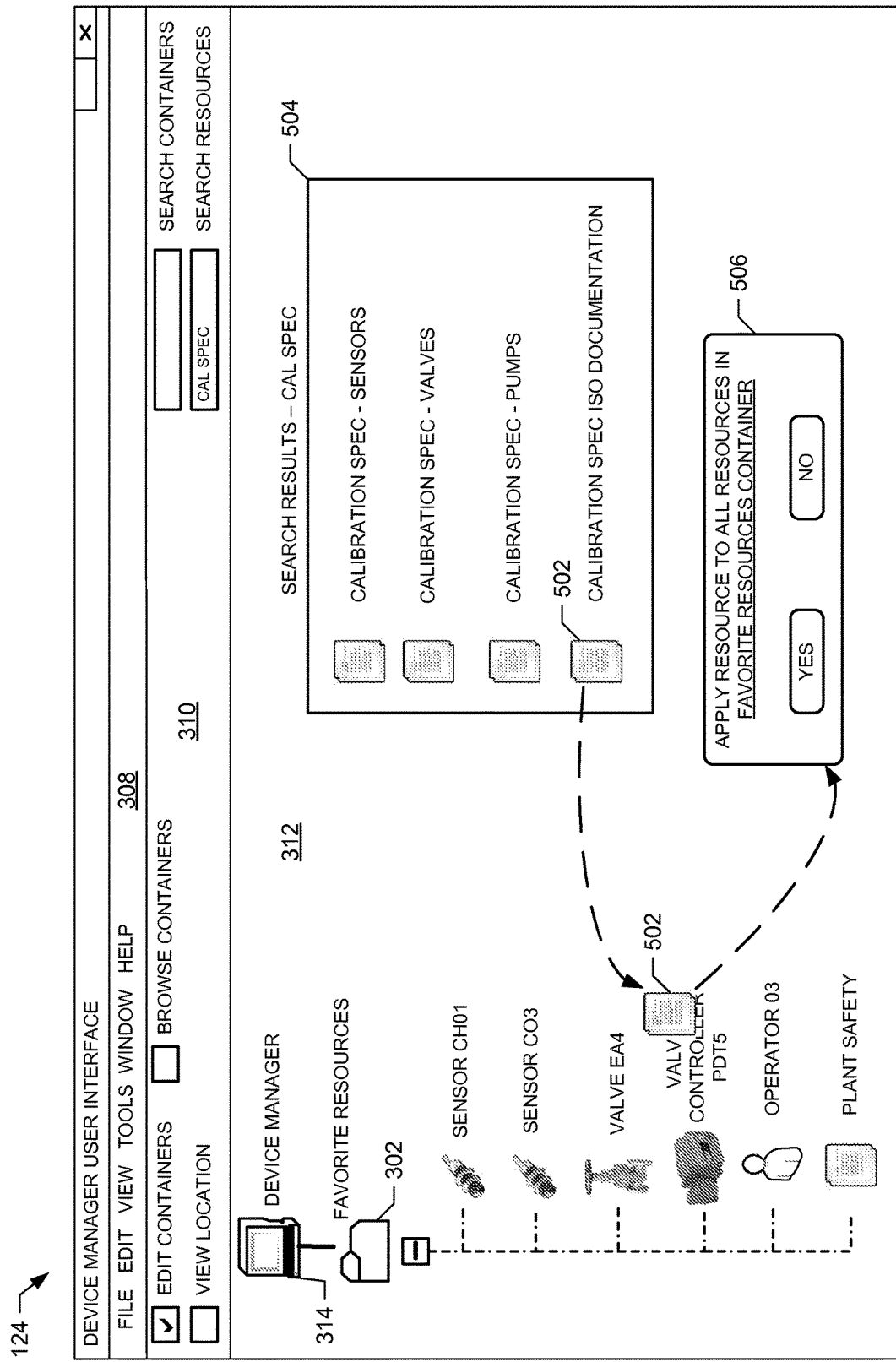

FIG. 5 shows the example user interface 124 of FIGS. 3 and 4 displaying a process control item 502 (e.g., a calibration specification ISO document) being associated with process control resources within the Favorite Resources logical container 302. In the illustrated example of FIG. 5, a user (e.g., a process control operator) uses the Search Resources function within the search panel 310 to search for process control resources that at least partially match the 'Cal Spec' phrase. The example device manager 102 of FIGS. 1 and 2 uses the phrase to search for matching process control resources and returns the search results via a search results box 504. The example device manager 102 displays the search results box 504 within the logical container panel 312 of the example user interface 124. In this example, the search results box 504 is included with the device manager tool 314.

In this example, the user selects and drags the Calibration Spec ISO Documentation process control item 502 to the Valve Controller PDT5 process control resource within the Favorite Resources logical container 302. The Calibration Spec ISO documentation process control item 502 is one example of a process control item. Other process control items can include process control resources, process control functions, process control features, and/or any other process control related object. After dropping the process control item 502 onto the resource, the example device manager 102 identifies a type of the item 502 and the resource to determine how the item 502 is to be associated with the resource. In this example, because the process control item 502 is a document and the process control resource is a field device, the example device manager 102 makes the Calibration Spec ISO Documentation item 502 available to view when process control personnel select to view the Valve Controller PDT5 resource. In other examples, associating a process control item with a resource may incorporate properties from the item into the resource. In yet other examples, associating a process control item with a process control resource may include adding the item to a work schedule of the resource.

In the example of FIG. 5, after the process control item 502 is associated with the process control resource, the device manager 102 prompts the user via a prompt box 506 by asking the user if the item 502 should be associated with the other process control resources within the Favorite Resources logical container 302. If the user selects Yes, the example device manager 102 associates the process control item 502 with the other process control resources. In other examples, the device manager 102 may associate the process control item 502 with the other resources without prompting a user. In this manner, the example device manager 102 enables process control personnel to relatively quickly and easily associate process control items with groups of related process control resources in a logical container.

Figure 6:
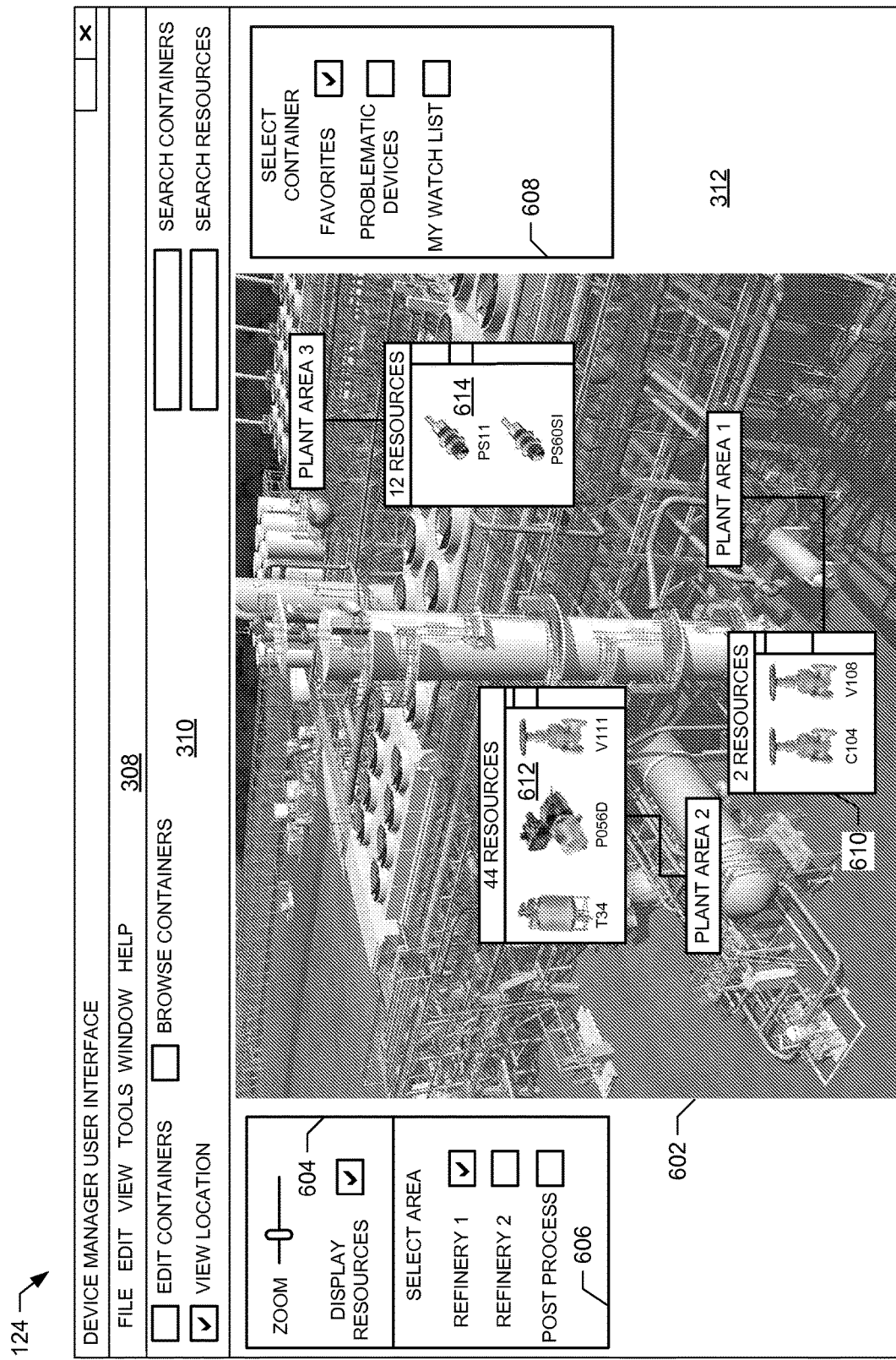
FIG. 6 shows the example user interface of FIGS. 3-5 displaying a pictorial representation of the process control environment of FIG. 1 including process control resources associated with a logical container.

FIG. 6 shows the example user interface 124 of FIGS. 3-5 displaying a pictorial representation 602 of, for example, the process control environment 100 of FIG. 1. In this example, a user selects the View Location function within the search panel 310 causing the example device manager 102 of FIGS. 1 and 2 to display the pictorial representation 602 within the logical container panel 312.

The example logical container panel 312 also includes a display panel 604, a selection panel 606, and a container selection panel 608. The example display panel 604 enables process control personnel to select a zoom level for the pictorial representation 602 (e.g., 'Zoom') and toggle displays of process control resources in the pictorial representation 602 (e.g., 'Display Resources'). The example selection panel 606 enables process control personnel to select which pictorial and/or graphical representation is displayed within the logical container panel 312. The example container selection panel 608 enables process control personnel to select which process control resources associated with a logical container are displayed within the pictorial representation 602. In this example, the Favorite Resources logical container 302 is selected (e.g., 'Favorites'). In other examples, the panels 604-608 may include additional or less functionality. Further, the logical container panel 312 may include additional or fewer panels for displaying process control resources in a pictorial and/or graphical representation of a process control system.

In the illustrated example of FIG. 6, the example device manager 102 creates a coordinate system for the pictorial representation 602. The example device manager 102 then determines where process control resources associated with the Favorite Resources logical container 302 are located in the pictorial representation 602 by matching location data associated with the resources to the coordinate system. The example device manager 102 then displays the process control resources in proximity to the determined locations. For example, two process control resources are shown being located in proximity to Plant Area 1 on the pictorial representation 602. The two resources are displayed within a scrollable resource box 610. Additionally, 44 process control resources are shown being located in proximity to Plant Area 2. The process control resources are displayed within a scrollable resource box 612. Further, 12 process control resources are displayed within a scrollable resource box 614 and are shown being located in proximity to Plant Area 3.

In this example, a user may select to zoom into a portion of the pictorial representation 602 to locate closer proximate locations of the process control resources. For example, a user may zoom into the Plant Area 2, causing the device manager 102 to partition the Plant Area 2 into sub-regions and determine locations for the 44 process control resources within the sub-regions. Alternatively, a user may select a process control resource from one of the resource boxes 610-614 to see a closer proximate location of the selected resource on the pictorial representation 602. In this manner, the example device manager 102 enables process control personnel to relatively quickly and easily locate locations of process control resources associated with the same logical container within a process control environment.

The proximate locations of the process control resources in the pictorial representation 602 are shown for illustrative purposes only. In other examples, the pictorial representation 602 may display proximate locations of process control resources with relatively greater resolution. For example, individual process control resources may be highlighted and/or indicated in the pictorial representation 602 or, alternatively, the pictorial representation 602 may include many more and/or smaller plant areas. In other examples, the pictorial representation 602 may include indicators of locations of process control resources that may be expanded to display, for example, the resource blocks 610-614 when a user selects the indicators.

Figure 7:
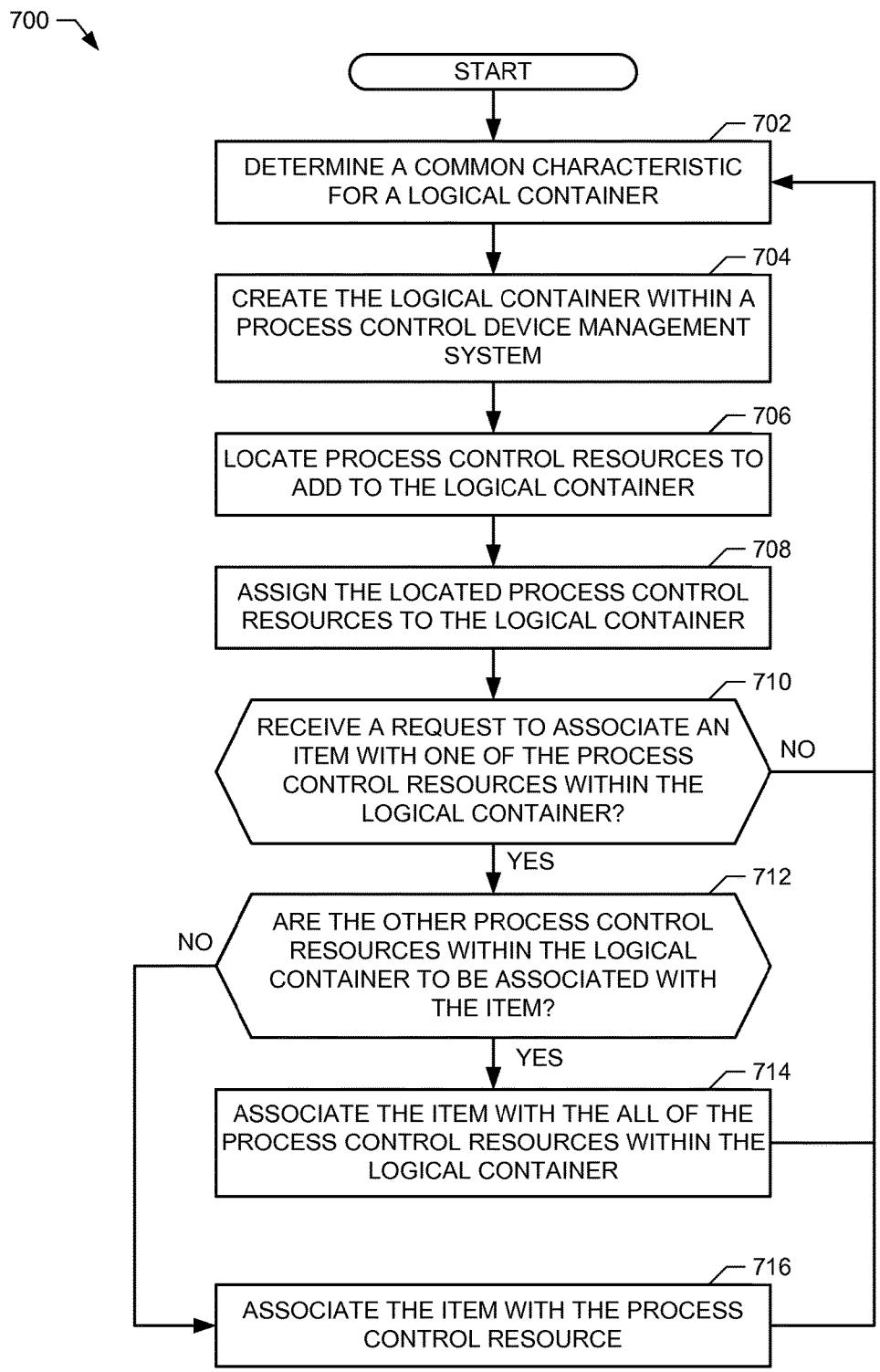
FIGS. 7-9 are flowcharts of example processes that may be used to implement the example device manager of FIGS. 1 and/or 2.
Figure 8:
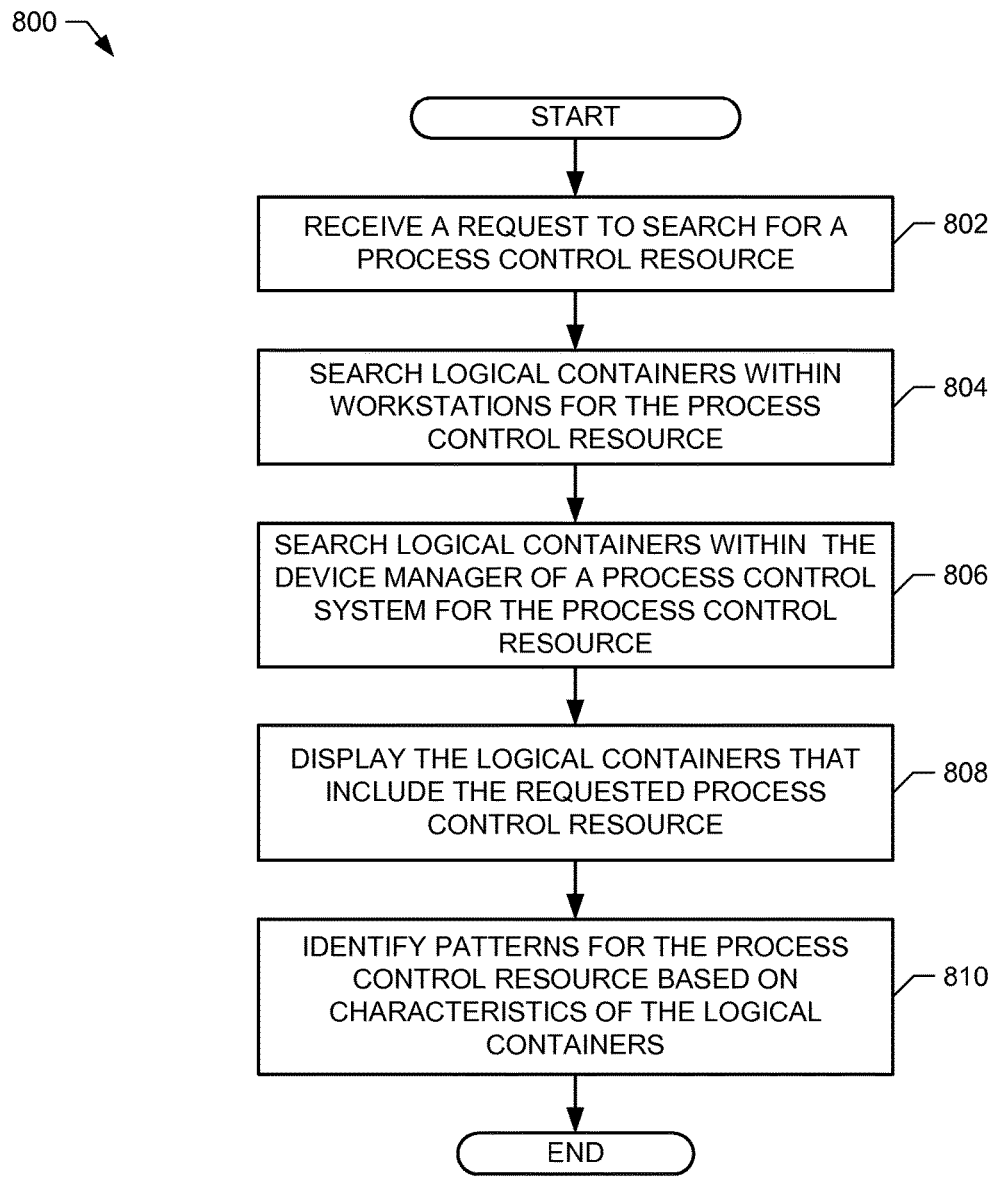
Figure 9:
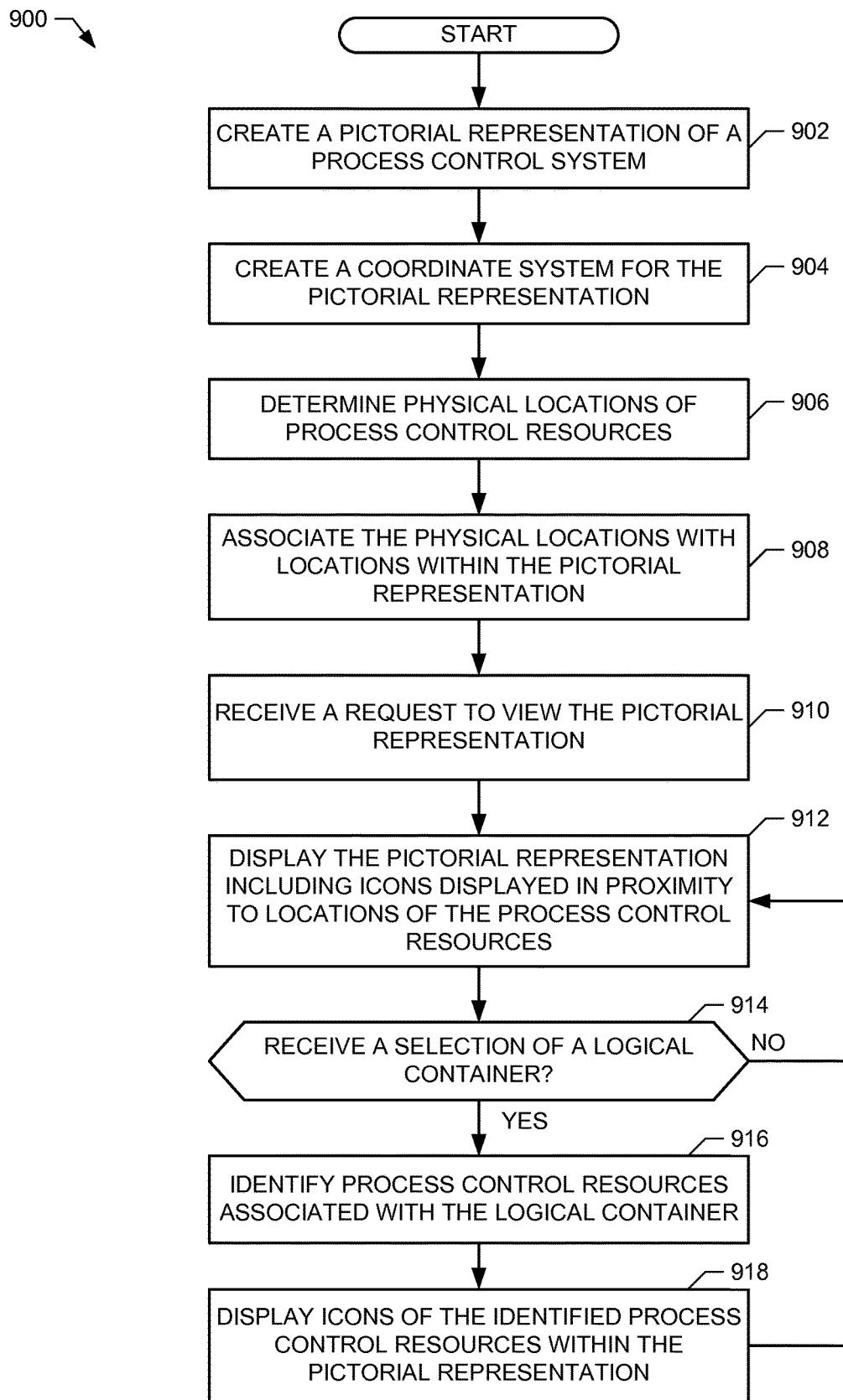

Flowcharts representative of example processes 700, 800, and 900 for implementing the device manager 102 of FIGS. 1-2 are shown in FIGS. 7-9. In this example, the processes 700, 800, and 900 may be implemented using the machine readable instructions in the form of a program for execution by a processor such as the processor P12 shown in the example processor system P10 discussed below in connection with FIG. 10. The program may be embodied in software stored on a tangible computer readable medium such as a CD-ROM, a floppy disk, a hard drive, a digital versatile disk (DVD), or a memory associated with the processor P12, but the entire program and/or parts thereof could alternatively be executed by a device other than the processor P12 and/or embodied in firmware or dedicated hardware. Further, although the example program is described with reference to the flowcharts illustrated in FIGS. 7-9, many other methods of implementing the example device manager 102 may alternatively be used. For example, the order of execution of the blocks may be changed, and/or some of the blocks described may be changed, eliminated, or combined.

As mentioned above, the example processes 700, 800, and 900 of FIGS. 7-9 may be implemented using coded instructions (e.g., computer readable instructions) stored on a tangible computer readable medium such as a hard disk drive, a flash memory, a ROM, a CD, a digital versatile disk (DVD), a cache, a RAM and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes 700, 800, and 900 of FIGS. 7-9 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporary buffering, and/or for caching of the information). As used herein, the term non-transitory computer readable medium is expressly defined to include any type of computer readable medium and to exclude propagating signals.

The example process 700 of FIG. 7 stores process control resources in a logical container. Multiple instances of the example process 700 may be implemented to concurrently store process control resources in different logical containers. Alternatively, the example process 700 may be implemented for each workstation (e.g., the workstation 104) that manages process control resources via logical containers. The example process 700 of FIG. 7 begins by determining a characteristic for a logical container (e.g., via the workstation interface 202 of FIG. 2) (block 702). The characteristic may be a common trait and/or preference associated with process control resources to be added to the logical container. The example process 700 then creates the logical container for the specified characteristic (e.g., via the container manager 204) (block 704). The example process 700 may create the logical container within an asset and/or device management tool, application and/or system.

The example process 700 of FIG. 7 continues by locating process control resources to add to the logical container (e.g., via the container manager 204 and/or the database interface 206) (block 706). The example process 700 may locate process control resources based on search criteria provided by process control personnel or, alternatively, by process control personnel navigating to and selecting resources to be added to the logical container. The example process 700 then assigns the selected process control resources to the logical container (e.g., via the container manager 204) (block 708). The example process 700 may assign the process control resources to the logical container by creating entries within the logical container that identify the resources and reference and/or link to information associated with the resources.

The example process 700 of FIG. 7 next determines if a request was received to associate a process control item with at least one of the process control resources within the logical container (e.g., via the container manager 204 and/or the workstation interface 202) (block 710). If a request was not received, the example process 700 creates another logical container upon a request from process control personnel (block 702). However, if a request was received, the example process 700 determines (e.g., prompts process control personnel) if other process control resources within the logical container are to be associated with the process control item (e.g., via the container manager 204) (block 712). If the other process control resources are to be associated with the process control item, the example process 700 associates the item with the other resources within the logical container (e.g., via the container manager 204) (block 714). The example process 700 may then create another logical container upon a request from process control personnel (block 702).

However, if the other process control resources are not to be associated with the process control item, the example process 700 associates the item with the selected process control resource (e.g., via the container manager 204) (block 716). The example process 700 may then create another logical container upon a request from process control personnel (block 702). Alternatively, the example process 700 may modify process control resources within a logical container upon receiving a request from process control personnel.

The example process 800 of FIG. 8 searches logical containers for specified process control resources to identify operational patterns associated with the resources. The example process 800 begins by receiving a request to search for a process control resource (e.g., via the search engine 208 and/or the workstation interface 202) (block 802). The example process 800 then searches logical containers within, for example, the resource database 126 that include the requested process control resource (e.g., via the search engine 208) (block 804).

The example process 800 of FIG. 8 continues by searching any logical containers that may be stored on workstations within device manager and/or asset management tools (e.g., via the search engine 208) (block 806). In this manner, the example process 800 searches centrally located databases and local workstations for logical containers created by process control personnel. The example process 800 then displays the identified logical containers that include the requested process control resource (e.g., via the display processor 212 and/or the renderer 214) (block 808). The example process 800 may then determine operational patterns for the process control resource based on types and/or characteristics of the logical containers that include the resource (e.g., via the search engine 208 and/or the container manager 204) (block 810). The example process 800 may also communicate the identified patterns to relevant process control personnel. The example process 800 may then terminate.

The example process 900 of FIG. 9 displays process control resources associated with a logical container within a pictorial and/or graphical representation of a process control system (e.g., the pictorial representation 602 of FIG. 6). The example process 900 begins by creating and/or obtaining a pictorial and/or graphical representation of a process control system and/or process control environment (e.g., via the location processor 210 and/or the workstation interface 202) (block 902). The example process 900 then creates a coordinate system for the pictorial representation (e.g., via the location processor 210) (block 904). The example coordinate system may correspond to GPS coordinates, latitude/longitude coordinates, and/or any other coordinates that describe locations on the pictorial representation.

The example process 900 of FIG. 9 continues by determining physical locations of process control resources that are located within the pictorial representation (e.g., via the location processor 210) (block 906). The example process 900 may determine locations of the resources by accessing metadata, provisioning files, and/or any other location information associated with the resources. In some instances, asset management tools may store locations of process control resources. The example process 900 then associates the physical locations of the process control resources with locations within the pictorial representation (e.g., via the location processor 210) (block 908). For example, the example process 900 may match a GPS location of a process control resource to corresponding GPS coordinates on the pictorial representation.

The example process 900 may then receive a request to view the pictorial representation (e.g., via the workstation interface 202) (block 910). In some instances, the example process 900 may receive the request some time after determining locations of process control resources in the pictorial representation. The example process 900 displays the pictorial representation including icons and/or other identifiers displayed in proximity to locations of the process control resources (e.g., via the display processor 212 and/or the renderer 214) (block 912). In other examples, the process 900 may display icons and/or indicators of the process control resources after process control personnel select a logical container.

The example process 900 of FIG. 9 then determines if a selection of a logical container has been received (e.g., via the workstation interface 202) (block 914). If a selection has not been received, the example process 900 continues to display the pictorial representation with the process control resources (block 912). However, if a selection has been received, the example process 900 identifies process control resources associated with the selected logical container (e.g., via the container manager 204 and/or the location processor 210) (block 916). The example process 900 then displays icons and/or other indicators of the process control resources that are associated within the selected logical container within the pictorial representation (e.g., via the display processor 212 and/or the renderer 214) (block 918). The example process 900 may then continue displaying the selected process control resources within the pictorial representation until process control personnel close the pictorial representation and/or select another logical container (block 912).

Figure 10:
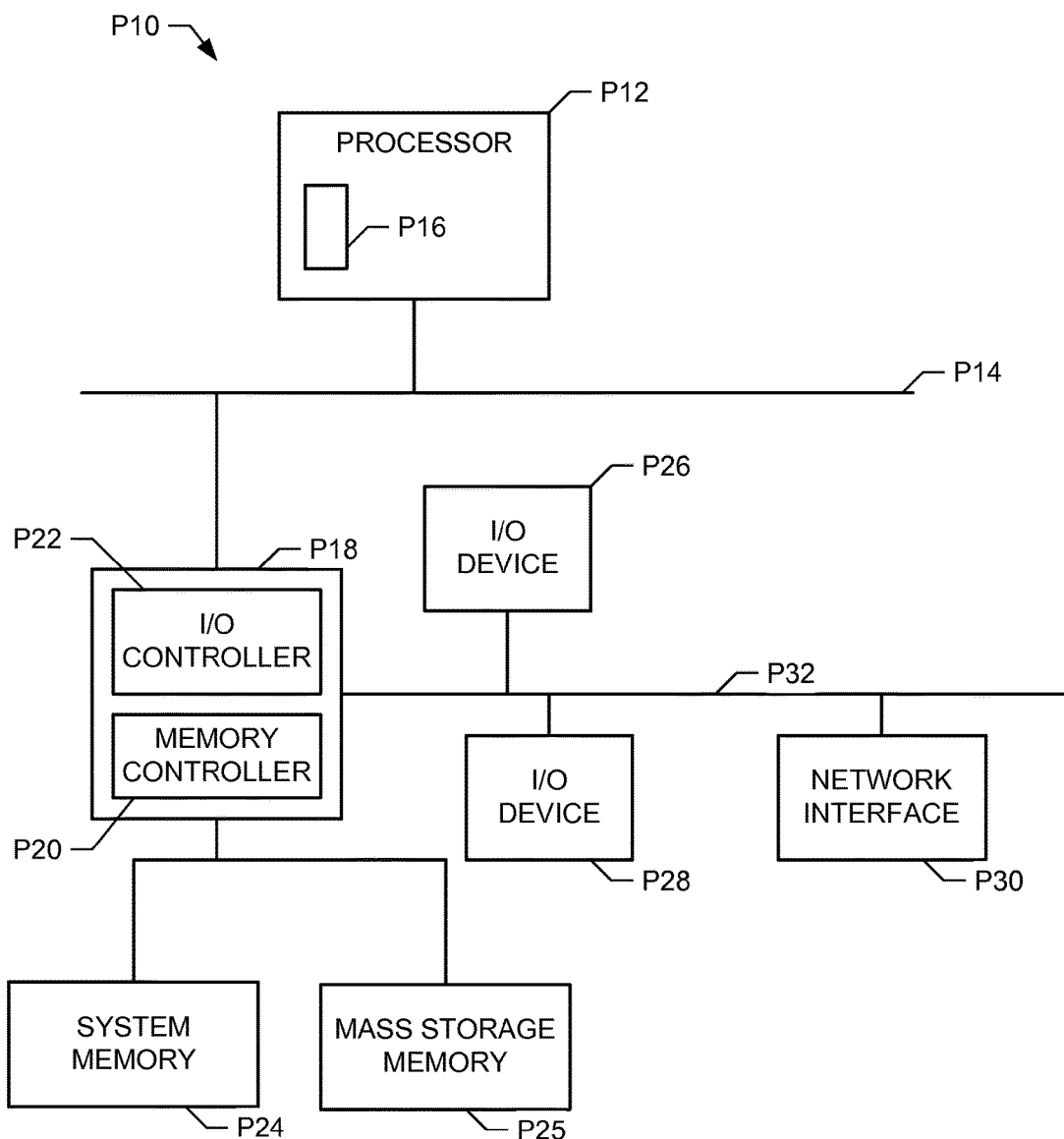
FIG. 10 is a block diagram of an example processor system that may be used to implement the example methods and apparatus described herein.

FIG. 10 is a block diagram of an example processor system P10 that may be used to implement the example methods and apparatus described herein. For example, processor systems similar or identical to the example processor system P10 may be used to implement the example workstation interface 202, the example container manager 204, the example database interface 206, the example search engine 208, the example location processor 210, the example display processor 212, the example renderer 214, the example resource database 126 and/or, more generally, the example device manager 102 of FIGS. 1 and/or 2. Although the example processor system P10 is described below as including a plurality of peripherals, interfaces, chips, memories, etc., one or more of those elements may be omitted from other example processor systems used to implement one or more of the example workstation interface 202, the example container manager 204, the example database interface 206, the example search engine 208, the example location processor 210, the example display processor 212, the example renderer 214, the example resource database 126 and/or, more generally, the example device manager 102.

As shown in FIG. 10, the processor system P10 includes a processor P12 that is coupled to an interconnection bus P14. The processor P12 includes a register set or register space P16, which is depicted in FIG. 10 as being entirely on-chip, but which could alternatively be located entirely or partially off-chip and directly coupled to the processor P12 via dedicated electrical connections and/or via the interconnection bus P14. The processor P12 may be any suitable processor, processing unit or microprocessor. Although not shown in FIG. 10, the system P10 may be a multi-processor system and, thus, may include one or more additional processors that are identical or similar to the processor P12 and that are communicatively coupled to the interconnection bus P14.

The processor P12 of FIG. 10 is coupled to a chipset P18, which includes a memory controller P20 and a peripheral input/output (I/O) controller P22. As is well known, a chipset typically provides I/O and memory management functions as well as a plurality of general purpose and/or special purpose registers, timers, etc. that are accessible or used by one or more processors coupled to the chipset P18. The memory controller P20 performs functions that enable the processor P12 (or processors if there are multiple processors) to access a system memory P24 and a mass storage memory P25.

The system memory P24 may include any desired type of volatile and/or non-volatile memory such as, for example, static random access memory (SRAM), dynamic random access memory (DRAM), flash memory, read-only memory (ROM), etc. The mass storage memory P25 may include any desired type of mass storage device. For example, if the example processor system P10 is used to implement the resource database 126 (FIGS. 1 and 2), the mass storage memory P25 may include a hard disk drive, an optical drive, a tape storage device, etc. Alternatively, if the example processor system P10 is used to implement the resource database 126, the mass storage memory P25 may include a solid-state memory (e.g., a flash memory, a RAM memory, etc.), a magnetic memory (e.g., a hard drive), or any other memory suitable for mass storage in the resource database 126.

The peripheral I/O controller P22 performs functions that enable the processor P12 to communicate with peripheral input/output (I/O) devices P26 and P28 and a network interface P30 via a peripheral I/O bus P32. The I/O devices P26 and P28 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface P30 may be, for example, an Ethernet device, an asynchronous transfer mode (ATM) device, an 802.11 device, a DSL modem, a cable modem, a cellular modem, etc. that enables the processor system P10 to communicate with another processor system.

While the memory controller P20 and the I/O controller P22 are depicted in FIG. 10 as separate functional blocks within the chipset P18, the functions performed by these blocks may be integrated within a single semiconductor circuit or may be implemented using two or more separate integrated circuits.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto. On the contrary, this patent covers all methods, systems, and machine-accessible medium fairly falling within the scope of the appended claims either literally or under the doctrine of equivalents.

What is claimed is:

1. A method to display graphical representations of process control field devices, the method comprising:

displaying, via a display screen, a pictorial representation of a process control system;

determining a location of a process control field device within the pictorial representation by matching location information associated with the process control field device to a corresponding location within the pictorial representation; and displaying, via the display screen, an icon in proximity to the location within the pictorial representation, the icon being a graphical representation of the process control field device and linking to information associated with the process control field device, the icon being graphically independent of the pictorial representation.

2. A method as defined in claim 1, wherein the pictorial representation is a photograph of the process control system.

3. A method as defined in claim 1, wherein the pictorial representation is at least one of a rendering, a map, or a drawing of the process control system.

4. A method as defined in claim 1, further comprising:
identifying a logical container that includes the process control field device;
displaying the icon within a graphical representation of the logical container, the logical container being displayed within the pictorial representation; and
displaying icons associated with other process control field devices included within the logical container in proximity to locations of the process control field devices within the pictorial representation.

5. A method as defined in claim 1, further comprising:
receiving a selection of a logical container prior to determining the location of the process control field device within the pictorial representation of the process control system; and
determining the process control field device is associated with the selected logical container.

6. A method as defined in claim 1, wherein determining the location of the process control field device comprises:
creating a coordinate system for the pictorial representation; and
matching the location information associated with the process control field device to a coordinate within the coordinate system.

7. A method to manage process control resources, the method comprising:
receiving, via a processor, a selection of a first process control resource within a process control system to be associated with a logical container, the logical container including other process control resources that have a same user defined characteristic in common with the first process control resource;
creating, via the processor, an entry within the logical container for the first process control resource by storing an identifier of the process control resource in the logical container; and
assigning, via the processor, the first process control resource to the logical container so that the identifier of the first process control resource links to process control information associated with the first process control resource.

8. A method as defined in claim 7, further comprising displaying the identifier within the logical container via a user interface to enable the user to locate the first process control resource without having knowledge of a resource hierarchy of the process control system.

9. A method as defined in claim 7, wherein the user defined characteristic includes at least one of a fault type, a history of common issues, a type of field device, a physical location, a user preference, a manufacturer, a calibration date, an installation date, or a communication type.

10. A method as defined in claim 7, further comprising:
associating a second process control resource with the first process control resource by dragging and dropping a graphical representation of the second process control resource to the identifier of the first process control resource displayed within the logical container;
identifying the other process control resources assigned to the logical container; and
associating the second process control resource with the other process control resources.

11. A method as defined in claim 10, wherein the second process control resource is a document.

12. A method as defined in claim 10, wherein the first, the second, and the other process control resources include at least field devices, components, process control personnel, process control assets, controllers, I/O cards, machinery, or manufacturing lines.

13. A method as defined in claim 7, further comprising:
selecting the first process control resource;
displaying via the user interface logical containers including the logical container that includes the first process control resource; and
determining a pattern of operational behavior based on a type of the logical containers that include the first process control resource.

14. An apparatus to manage process control resources, the apparatus comprising:
a container manager to:
select an icon representative of a process control resource within a process control system requested to be associated with a logical container, the icon including a link to information associated with the process control resource; and
assign the process control resource to the logical container so that the icon of the process control resource is displayed within the logical container via a user interface, the logical container including other process control resources that have a same user defined characteristic in common with the process control resource.

15. An apparatus as defined in claim 14, further comprising a database interface to store the logical container to a resource database.

16. An apparatus as defined in claim 14, wherein the container manager is to assign the process control resource to the logical container by creating an entry within the logical container that includes identifying information associated with the process control resource and includes a link to process control resource information corresponding to the process control resource.

17. An apparatus as defined in claim 14, wherein the container manager is to:
associate a process control item with the process control resource by dragging and dropping a graphical representation of the process control item to the icon;
identify the other process control resources assigned to the logical container; and
associate the process control item with the other process control resources within the logical container.

18. An apparatus as defined in claim 14, wherein the container manager is to:
receive a selection of the process control resource via the user interface; and
determine logical containers including the logical container that includes the process control resource; and
determine a pattern of operational behavior based on type of the logical containers that include the process control resource.

19. An apparatus as defined in claim 18, further comprising a renderer to display the determined logical containers.

20. An apparatus as defined in claim 14, further comprising a location processor to:
determine a location of a process control resource within a pictorial representation of a process control system by matching location information associated with the process control resource to a corresponding location within the pictorial representation; and
selecting an icon to display in proximity to the location within the pictorial representation, the icon being a graphical representation of the process control resource and linking to information associated with the process control resource.

21. An apparatus as defined in claim 20, further comprising a display processor to display the pictorial representation and the icon.

22. An apparatus as defined in claim 20, wherein the location processor is to:
receive a selection of the logical container;
identify process control resources included within the logical container; and
determine locations for the process control resources in the pictorial representation.

23. An apparatus as defined in claim 22, wherein the display processor is to display icons associated with the process control resources in the pictorial representation, the display processor displaying the icons in proximity to the locations of the process control resources represented by the pictorial representation.

24. An apparatus as defined in claim 14, wherein the user defined characteristic includes at least one of a fault type, a history of common issues, a type of field device, a physical location, a user preference, a manufacturer, a calibration date, an installation date, or a communication type.

25. A tangible article of manufacture storing machine-readable instructions that, when executed, cause a machine to at least:
display a pictorial representation of a process control system;
determine a location of a process control resource within the pictorial representation by matching location information associated with the process control resource to a corresponding location within the pictorial representation; and
display an icon in proximity to the location within the pictorial representation, the icon being a graphical representation of the process control resource and linking to information associated with the process control resource, the icon being graphically independent of the pictorial representation.

26. A tangible article of manufacture as defined in claim 25, wherein the machine-readable instructions, when executed, cause the machine to:
identify a logical container that includes the process control field device; and
display icons associated with other process control field devices included within the logical container in proximity to locations of the process control field devices within the pictorial representation.

27. A tangible article of manufacture as defined in claim 26, wherein the machine-readable instructions, when executed, cause the machine to:

receive a selection of the process control resource to be associated with the logical container, the logical container including other process control resources that have a same user defined characteristic in common with the process control resource;

creating an entry within the logical container for the process control resource by storing an identifier of the process control resource in the logical container; and assigning the process control resource to the logical container so that the identifier of the process control resource links to process control information associated with the process control resource.

28. A tangible article of manufacture as defined in claim 27, wherein the machine-readable instructions, when executed, cause the machine to select the process control resource;

display via a user interface logical containers including the logical container that includes the process control resource; and determining a pattern of operational behavior based on a type of the logical containers that include the process control resource.

\* \* \* \* \*